June 1, 1965
A. B. STILES
3,186,957
METHOD OF PREPARING A NICKEL OXIDE-ALUMINA CATALYST
COMPOSITION AND THE PRODUCT THEREOF
Filed April 14, 1960
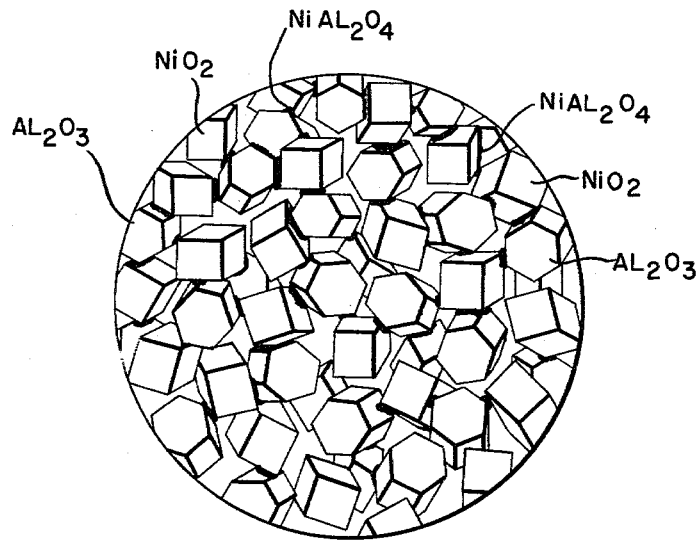
INVENTOR
ALVIN B. STILES
BY *Albert B. Griggs*
ATTORNEY 3,186,957
METHOD OF PREPARING A NICKEL OXIDE-ALUMINA CATALYST COMPOSITION AND THE PRODUCT THEREOF
Alvin B. Stiles, Charleston, W. Va., assignor to E. I. du Pont de Nemours and Company, Wilmington, Del., a corporation of Delaware
Filed Apr. 14, 1960, Ser. No. 22,253
7 Claims. (Cl. 252—466)

This invention relates to nickel-alumina catalysts and is more particularly directed to nickel oxide-gamma alumina catalysts in which the particles of the respective oxides are intimately associated and are separated by an interface of nickel aluminate. The invention is further directed to processes for preparing the catalysts by coprecipitation followed by calcination.

The nickel-alumina catalysts of the invention can advantageously be used for any reaction in which nickel-alumina catalysts have heretofore been employed and for purposes for which active nickel catalysts have been used. Thus they can be used for reforming of hydrocarbons, such as methane, ethane and the like in the presence of steam, with or without carbon dioxide, to form carbon monoxide and hydrogen. They can also be used for hydrogenation.

The catalysts of the invention can be used as are those of the prior art under customary conditions. Thus in reforming, hydrocarbons such as methane, a mixture of the hydrocarbons, and steam, with or without added carbon dioxide, can be passed over the catalyst at a temperature between 675° C. and 1050° C., preferably between 790° C. and 1000° C. Pressures can be used ranging from 1 to 20 atmospheres.

An object of the present invention is to provide an improved catalyst suitable for the preparation of synthesis gases from hydrocarbons, and especially from natural gas, and steam, and also adapted to other uses customarily made of nickel-alumina catalysts and nickel catalysts such as for hydrogenation.

The nickel-alumina catalysts of the present invention are exceedingly strong without the addition of cements or foreign bodies which serve as bonding agents or supports. This strength is achieved, as described more fully hereafter, by the formation of a nickel-aluminate interface which apparently serves to lend rigidity, strength, hardness, and structural stability to catalyst masses of the invention. Partly because of the absence of foreign binding agents and partly because of its novel structure, the catalysts of the present invention have very high catalytic activity per unit of volume. This permits operation of processes using the catalyst at either low temperatures in which savings in fuel are effected or by operating at extremely high through-put at more or less normal operating temperatures in which case plant investment is minimized for a given production.

It is known that when alumina is heated to a temperature of 900° C. or higher, the crystals present are changed to the alpha form. The surprising discovery has been made that when alumina in the gamma crystalline form is coprecipitated with nickel, as described hereinafter (Example 1), the coprecipitated product catalyst with the alumina in the gamma crystalline form is not converted by high temperatures to the alpha crystalline form. The reason for this phenomena is not clearly understood but by utilizing it in the reforming of hydrocarbons, a highly efficient catalyst mass can be provided which has an exceptionally long life when disposed in the down-stream portion of the catalyst zone.

The products of the invention can be further described by saying that a slurry of a conventional alpha alumina hydrate is mixed with a soluble nickel salt and the nickel salt is then coprecipitated as the carbonate, the hydrate, the oxalate, or another compound which readily decomposes to nickel oxide upon heating. The coprecipitate thus obtained is dried and is calcined at a relatively low temperature in a range at which the alpha form of alumina hydrate converts to the gamma form of aluminum oxide. This range is about 250° C. to 600° C.

The product thus prepared is stabilized against conversion of the gamma form over to the alpha form at high temperatures by the intimate association of nickel oxide particles with the alumina. The coprecipitate is formed into suitable shapes and heated to a temperature such as 950° C. to 1100° C. This heating strengthens the pellets and causes a surface reaction between the nickel oxide and the gamma alumina to form a nickel aluminate interface. This will be discussed hereinafter.

The chemical composition of the catalysts of the invention can be determined with some accuracy using conventional X-ray techniques. The presence of nickel oxide, of gamma alumina, and of a nickel aluminate can be established by an X-ray scan made in the conventional fashion.

The structure of the novel catalysts of the invention is illustrated in the drawing. In the drawing nickel oxide is represented by cubes because this is the system in which this material ordinarily forms crystals. The gamma alumina is similarly represented as hexagonal crystals. The nickel oxide and gamma alumina are randomly arranged because they are coprecipitated and being of different shapes each tends to keep the other from packing into a compact and coalesced mass upon heating. Nickel aluminate is represented as binding the diverse crystals and is illustrated in the figure without reference to its crystal system. Its crystalline nature is demonstrated by X-ray but some portion at least may be amorphous.

It will be understood that the crystals of the nickel oxide, the gamma alumina, and the nickel aluminate are all far too small to be seen by microscopic observation and the drawing is an artist's representation of what is believed to be the physical state of the components of the catalyst based upon the data available. The crystallite size is on the order of 200 to 400 angstroms but is not believed to be extremely important as long as it does not greatly exceed about 500 angstroms. Above about 600 angstroms there would be some loss of activity. This would become increasingly great as the crystallite size gets larger and larger.

Additional evidence for the existence of the nickel aluminate and its function are obtained from the typical green color which develops when the catalyst is heated and the nickel aluminate forms. The strength of the catalyst is further evidence that there is a strong bonding action of some kind and the evident formation of nickel aluminate explains why the particles are so rigidly bound together.

The soluble nickel salts to be used in preparing catalysts of the invention can include any nickel compound soluble enough to be employed. Generally these would include such salts as nickel chloride, nickel nitrate, nickel propionate, nickel sulfamate, nickel acetate, nickel formate, and nickel hydroxyacetate. Of these compounds it is somewhat preferred to use nickel nitrate because the nitrate is easily removed by volatilization.

The alpha alumina hydrate is a commercially available material which is sometimes used in making catalysts or as a catalyst. It has the formula $Al(OH)_3$. The alumina hydrate should be in a very fine state of subdivision so that it can be intimately coprecipitated with the nickel carbonate or other compound as herein described. The particle size of a preferred material is less than one-half micron although materials suitable for use can have a particle size up to about 75 microns or even somewhat larger. The alumina hydrate is a pulverulent product which may agglomerate to larger particles or clusters which can be broken down to the sizes indicated in an aqueous slurry or dispersion using vigorous mechanical agitation or dispersion means.

There are commercially available alpha alumina hydrates of even smaller particle size and any of these can be used. Thus one commercially available product has an ultimate particle size of about 5 millimicrons and this can be used. In speaking of particle size just above, it will be understood that reference is made to the average particle size, excluding any extraordinary large particles or impurities which might simply be present as more or less inactive contaminants. The oversize material should ordinarily not exceed more than about 5 or 10%. The particles outside the ranges indicated, even though considerably larger than desired, nevertheless contribute to the catalytic effectiveness of the product and are merely less desired in their physical state.

In processes of the invention as herein described an aqueous dispersion of the alpha alumina hydrate and of a nickel salt is treated with a precipitant for the nickel to form an intimate coprecipitate. Any precipitant can be used such as ammonium, sodium and potassium carbonates, bicarbonates, and hydroxides. Ammonium, potassium, and sodium oxalate can also be used. Generally it will be preferred to use a precipitant which will lead to products readily converted on heat treatment so that the final product will contain nothing beyond the desired alumina and nickel oxide. Thus the nickel should be precipitated as a carbonate by using one of the carbonates or bicarbonates mentioned and one can additionally pass carbon dioxide into the slurry simultaneously when the precipitation is being effected with ammonium hydroxide.

The amount of nickel compound used and coprecipitated with the alumina should be selected so that the nickel oxide:alumina ratio is within the range 60:40 to 90:10. It will additionally be understood that the amount of coprecipitants in a slurry can be widely varied up to the point where the slurry becomes unmanageable because it is too thick. In some instances there is a tendency for re-solution of some of the components. For example, ammonium nitrate in high concentrations will tend to redissolve a nickel carbonate precipitate and hinder formation of a suitable coprecipitate having the desired alumina:nickel ratio.

Following precipitation a mother liquor is removed from the coprecipitate by filtration, centrifuging or other appropriate means. If there are soluble salts present which when the catalyst is heated will not be removed by volatilization then these can be washed in customary fashion.

After removal of mother liquor the catalyst is dried at a temperature somewhat in excess of 100° C. but below the temperature of decomposition of carbonates and other decomposable precipitates.

Thereafter the product is calcined in air at around 400° C. The temperature of this calcination can vary from about 300 to 500° C. depending somewhat upon the decomposable components in the coprecipitate. The temperature should not exceed about 700° C. at which point there is a beginning of formation of nickel aluminate and cementing of the particles together.

After the calcination as just described the product is pelleted. To do this the product is first densified by kneading with water or other inert liquid. This is then dried and pulverized to pass 100% through a 10 mesh screen. Of course the exact size of the particles is not at all critical and the figure given is fairly typical of those suitable.

The powder thus prepared is mixed intimately with a pilling lubricant such as graphite, a stearate, or other conventional lubricants and formed into a pellet in a conventional pelleting or tableting machine. The pellet can be of any form.

The formed particles are then calcined at a temperature above 700° C. to effect a bonding action and strengthening of the coprecipitate which, as described above, is believed to result from the formation of an interface of nickel aluminate at the points of intimacy of contact between the alumina and nickel oxide. The temperature can go up to that at which the interaction between the crystallites of alumina and nickel oxide begins to become excessive with a consequent destruction of catalytic value with unneeded increasing strength. Generally it will not be desirable to heat much above 1100° C. though somewhat higher temperatures can be obtained with increasing hardness of catalysts. Higher temperatures can of course be used if the time of heating is kept short. Actually an observer can tell when heating has been sufficient because the catalyst begins to turn green and the extent of aluminate formation can readily be judged by inspecting a small cooled sample. It is preferred to heat at a temperature around 1050° C. partly because this temperature is easily obtained in readily available industrial heating equipment. The time of heating at this temperature is about three hours, though again this depends upon how much hardness is wanted.

It is also to be observed that the low temperature calcination converts the alpha alumina hydrate to the gamma form of aluminum oxide. Ordinarily catalysts of the invention will contain not less than about 75% of the alumina in the gamma form after either of the calcinations. The presence of the nickel oxide as a coprecipitate as herein described prevents the gamma alumina converting to another and inactive form upon the higher temperature calcination.

In the examples which follow, parts are by weight unless otherwise stated.

EXAMPLE 1

A slurry is made by suspending, with agitation, alpha alumina hydrate having a major part of the particles in the size range 0.5 to 75 microns in an aqueous solution of nickel nitrate. When carefully dehydrated, alpha alumina hydrate is converted to gamma aluminum oxide. The ratio of nickel oxide to aluminum oxide should be in the range of 60:40 to 90:10. The nickel is precipitated as the carbonate with ammonium carbonate under such conditions that the particulate alumina hydrate is occluded and is intimately mixed with the nickel carbonate. The nickel carbonate-alumina hydrate mixture, containing some nickel aluminate, is washed, dried, then calcined at 400° C. to decompose the product to the oxides. The mixture of oxides is pelleted, then is heated in an oxidizing atmosphere to a temperature of 1050° C. to harden the pellets. This catalyst is of high activity, its support containing not less than 75% of the alumina in the gamma form, and is used in the down-stream portion of a catalyst bed used in the process for reforming hydrocarbons.

EXAMPLE 2

A preferred catalyst of the invention is prepared as follows:

Alpha alumina hydrate employed was a commercially available product having the analysis of nearly 100% Al(OH)$_3$ and having the following particles size distribution:

99% less than 0.5 micron
100% less than 325 mesh per inch

The product was a pulverulent powder which was made into a slurry by vigorous agitation of 10.5 pounds of alumina hydrate per each 100 gallons of water. Before the alumina was added there was dissolved in the water 65 pounds of nickel nitrate, Ni(NO$_3$)$_2$.

To the suspension heated at 90° C. there was slowly added anhydrous-ammonia vapor and gaseous carbon dioxide in the proportion of 3 moles of carbon dioxide per mole of ammonia. This addition was continued until the precipitation ceased at which time the ammonia addition was stopped but the carbon dioxide was continued for an additional one-half hour. The purpose of the subsequent addition of carbon dioxide is to re-precipitate the nickel which has inadvertently been converted partially to water soluble nickel amines.

The ratio of nickel oxide:aluminum oxide in a coprecipitate is about 75:25 on a weight basis. The coprecipitate was washed with water, dried at 145° C. and then calcined at 400° C. for three hours to decompose the carbonate and to convert the alpha alumina hydrate to gamma alumina.

The calcined product was kneaded with a weight of water equal to 75% of the weight of the dry product and the resulting paste was dried at 145° C. The dried product was then ground to 100% through a 10 mesh screen. The resulting powder was mixed with 3% of vegetable stearin and pelleted.

The pellets were then heated in air to a temperature of 1050° C. for three hours. The pellets turned green and were hardened by the treatment. There was no detectable alpha alumina in the product, the only alumina being present therein as gamma alumina and as nickel aluminate.

After the pelleting the pellets are heated in air to 400° C. to remove the stearin by oxidation under mild conditions and then the pellets were heated at 1050° C. for three hours.

Instead of using nickel nitrate another soluble nickel salt such as nickel chloride, nickel sulfate, nickel sulfamate, and nickel hydroxyacetate can be used in stoichiometric amount to give the same results. Similarly the ammonium hydroxide can be replaced by the required amount of ammonium, sodium, potassium, carbonates and bicarbonates, and their hydroxides, and ammonium, potassium, and sodium oxalate.

This application is a continuation-in-part of my U.S. applications Serial No. 290,819 filed May 29, 1952, now abandoned and Serial No. 576,534 filed April 6, 1956, also now abandoned.

I claim:

1. In a process for making nickel-alumina catalysts the steps comprising adding nickel nitrate to an aqueous suspension of alpha alumina hydrate, the nickel-oxide:aluminum-oxide ratio being 60:40 to 90:10, precipitating the nickel with ammonium carbonate to form nickel carbonate, drying and calcining the nickel alumina solids thus obtained at a temperature from 250° C. to 600° C., shaping said calcined solids and then calcining to harden by heating in an oxidizing atmosphere to a temperature of 950° C. to 1100° C.

2. In a process for making nickel-alumina catalysts the steps comprising adding nickel nitrate to an aqueous suspension of alpha alumina hydrate, the nickel-oxide:aluminum-oxide ratio being 60:40 to 90:10, precipitating the nickel with ammonium carbonate to form nickel carbonate, drying and calcining the nickel alumina solids thus obtained at a temperature from 250° C. to 600° C., shaping said calcined solids and then calcining to harden by heating in an oxidizing atmosphere to a temperature of 1050° C.

3. In a process for making nickel-alumina catalysts the steps comprising adding nickel nitrate to an aqueous suspension of alpha alumina hydrate in the nickel-oxide:alumina-oxide ratio of 60:40 to 90:10, precipitating the nickel with ammonium carbonate, drying the alumina hydrate and nickel carbonate solids thus obtained, calcining at a temperature of 400° C., pelleting and then heating in an oxidizing atmosphere at 1050° C. to harden the pellets.

4. A nickel-alumina catalyst which has a nickel oxide:alumina ratio of 60:40 to 90:10 and in which the nickel oxide particles are intimately mixed with gamma alumina particles, there being an interface of nickel aluminate between the particles and binding them together.

5. A nickel-alumina catalyst which has a nickel oxide:alumina ratio of 60:40 to 90:10 and in which the nickel oxide particles are intimately mixed with gamma alumina particles, there being an interface of nickel aluminate between the particles and binding them together, the crystallite size of the nickel oxide and the alumina being under 600 angstroms.

6. A nickel-alumina catalyst which has a nickel oxide:alumina ratio of 60:40 to 90:10 and in which the nickel oxide particles are intimately mixed with gamma alumina particles, there being an interface of nickel aluminate between the particles and binding them together, the crystallite size of the nickel oxide and the alumina being between 200 and 400 angstroms.

7. In a process for making nickel-alumina catalysts the steps comprising adding a soluble nickel salt to a suspension of alpha alumina hydrate, the nickel oxide:aluminum oxide ratio being 60:40 to 90:10, precipitating the nickel as a heat-decomposable compound selected from the group consisting of nickel carbonate, nickel hydroxide, and nickel oxalate, drying and calcining the nickel-alumina solids thus obtained at a temperature from 250° C. to 600° C., shaping said calcined solids and then calcining in an oxidizing atmosphere to a temperature of 700° C. to 1100° C.

References Cited by the Examiner
UNITED STATES PATENTS

| | | | |
|---|---|---|---|
| 2,002,534 | 5/35 | Frolich | 252—466 X |
| 2,038,566 | 4/36 | Huetner et al. | 252—466 |
| 2,151,329 | 3/39 | Page et al. | 252—466 |
| 2,974,161 | 3/61 | Keith et al. | 252—466 X |

MAURICE A. BRINDISI, *Primary Examiner.*

JULIUS GREENWALD, *Examiner.*